(12) United States Patent
Chen et al.

(10) Patent No.: US 11,874,166 B2
(45) Date of Patent: Jan. 16, 2024

(54) LIGHT SENSOR CIRCUIT

(71) Applicant: SENSORTEK TECHNOLOGY CORP., Zhubei (TW)

(72) Inventors: Wen-Cheng Chen, Zhubei (TW); Kai-Hsiang Chan, Zhubei (TW); Sheng-Wen Huang, Zhubei (TW)

(73) Assignee: Sensortek Technology Corp., Zhubei (TW)

( * ) Notice: Subject to any disclaimer, the term of this patent is extended or adjusted under 35 U.S.C. 154(b) by 0 days.

(21) Appl. No.: 17/938,451

(22) Filed: Oct. 6, 2022

(65) Prior Publication Data

US 2023/0243697 A1 Aug. 3, 2023

Related U.S. Application Data

(60) Provisional application No. 63/252,681, filed on Oct. 6, 2021.

(51) Int. Cl.
*G01J 1/46* (2006.01)
*G01J 1/02* (2006.01)
*G01J 1/44* (2006.01)

(52) U.S. Cl.
CPC .............. *G01J 1/46* (2013.01); *G01J 1/0228* (2013.01); *G01J 2001/446* (2013.01)

(58) Field of Classification Search
CPC .. G01J 1/46; G01J 1/446; G01J 1/4446; G01J 1/44; G01J 1/0228; G01J 1/02; G01J 2001/444; G01J 2001/4426; G01J 1/18; G01J 2001/186; H04N 25/60; H04N 25/318; H04N 25/63
See application file for complete search history.

(56) References Cited

U.S. PATENT DOCUMENTS

| | | | | |
|---|---|---|---|---|
| 6,757,627 B2* | 6/2004 | Mizuno | ...................... | G01J 1/46 348/E5.079 |
| 7,388,183 B2* | 6/2008 | Takayanagi | ....... | H01L 27/14603 250/214 R |
| 7,829,837 B2* | 11/2010 | Takayanagi | ............ | H04N 25/63 250/214 R |
| 8,946,640 B2* | 2/2015 | Woolaway | ................ | G01J 1/46 250/252.1 |
| 9,739,659 B2* | 8/2017 | Xu | ............. | G01J 1/44 |
| 11,143,553 B2* | 10/2021 | Williams, III | ............ | H03F 3/08 |
| 11,438,006 B2* | 9/2022 | Williams, III | .......... | H03M 1/52 |

(Continued)

OTHER PUBLICATIONS

Gao, Zhiyuan, et al., (2015) "A dynamic range enhanced readout technique with a two-step TDC for high speed linear CMOS image sensors." Sensors 15(11), 28224-28243.

(Continued)

*Primary Examiner* — John R Lee
(74) *Attorney, Agent, or Firm* — Rosenberg, Klein & Lee

(57) ABSTRACT

The present application discloses a light sensor circuit, which comprises a photodiode and a capacitor unit. The cathode of the photodiode is controlled by a capacitive unit to maintain the same or close voltage level as the anode of the photodiode, which significantly reduces the effect of the dark current of the photodiode. Thus, the light sensor circuit can effectively maintain the performance and accuracy of an analog-to-digital converter applying the light sensor circuit. The circuit design difficulty and manufacturing cost are also significantly reduced.

8 Claims, 5 Drawing Sheets

(56) References Cited

U.S. PATENT DOCUMENTS

| | | | | |
|---|---|---|---|---|
| 2002/0029122 A1* | 3/2002 | Mizuno | ............... | H04N 25/00 348/E5.079 |
| 2002/0190193 A1* | 12/2002 | Mizuno | ............... | G01J 1/46 250/214 R |
| 2004/0036009 A1 | 2/2004 | Takayanagi et al. | | |
| 2004/0118994 A1* | 6/2004 | Mizuno | ............... | G01J 1/46 250/214 R |
| 2009/0152446 A1* | 6/2009 | Mizuno | ............... | G01J 1/46 250/214 R |
| 2015/0102209 A1* | 4/2015 | Xu | ............... | G01J 1/46 250/214 LA |
| 2019/0212194 A1 | 7/2019 | Greimel-Rechling et al. | | |

OTHER PUBLICATIONS

First Office Action mailed to Taiwanese Counterpart Patent Application No. 111138100 dated May 10, 2023.

Search Report mailed to Taiwanese Counterpart Patent Application No. 111138100 dated May 10, 2023.

\* cited by examiner

LIGHT SENSOR CIRCUIT

FIELD OF THE INVENTION

The present application refers to a light sensor circuit, particularly to a light sensor circuit using a photodiode.

BACKGROUND OF THE INVENTION

The light sensors performed based on light sensing technology are widely utilized in many applications. For example, the ambient light sensors (ALS) may be used in electronic products to sense the intensity of ambient light in order to adjust the brightness of the display screen. Other light sensors may be used to measure the distance or position in space. For instance, mobile electronic devices usually include proximity sensors that can detect the distance between a user's face and the display screen of the electronic device. Therefore, the electronic device can turn off the display screen and touch functionality when the proximity sensor detects that the user's face is close to the device.

Generally, light sensors require an Analog-to-Digital Converter (ADC) to convert the analog input signal generated by the sensing light into a digital signal that can be processed by digital circuits. There are many types of ADCs, each with different operational mechanisms, characteristics, and functions. Taiwan Patent No. 1590591 discloses an analog-to-digital converter with high dynamic operating range and high linearity. It uses an integration unit and other corresponding circuits to convert the analog input signal obtained from a photodiode sensing light into a digital signal.

However, this type of ADC encounters problems with the characteristics of the photodiode, such as junction capacitance and dark current. For example, as shown in FIG. 1, the signal of a light sensor circuit 9 is generated by a photocurrent produced by a photodiode 90, which consists of a sum of dark current IDARK and photo-generated current IPD. In order to improve the linearity of the sensor, it is necessary to calibrate the dark current IDARK in advance to avoid affecting the integrator 92 and reducing the accuracy of the sensing result when performing precise sensor measurements.

Although the applicant has previously proposed a Taiwan patent No. 1770601, which discloses a light sensor circuit 8 that can reduce the junction capacitance of the photodiode 80 to improve the charging and discharging speed and accuracy of the analog front-end circuit. However, as shown in FIG. 2, the patent application requires the use of a voltage follower 82 to control the bias voltage at both ends of the photodiode 80, which requires additional consideration of the driving ability and error value of the operational amplifier or corresponding circuit used to construct the voltage follower 82. Moreover, as shown in FIG. 1, if the integrator 92 operates practically at a reference voltage VCM, it will further increase the difficulty of designing the light sensor circuit 8 of the patent application.

Due to the aforementioned problems, the present invention provides another type of light sensor circuit to solve the problems of junction capacitance or dark current of the photodiode.

SUMMARY OF THE INVENTION

The purpose of the present invention is to provide a light sensor circuit comprising a photodiode and a capacitor unit. By controlling the capacitor unit to maintain the cathode of the photodiode at a voltage level similar to or close to that of the anode, the visible junction capacitance of the photodiode can be effectively reduced, thereby significantly reducing the influence of dark current. Therefore, when the light sensor circuit is applied to an analog-to-digital converter, it can effectively maintain the performance and accuracy of the analog-to-digital converter. Moreover, the present invention only requires a simple circuit structure consisting of capacitor components and switch components to reduce the influence of dark current of the photodiode, significantly reducing the difficulty of circuit design and manufacturing cost.

The present invention relates to a light sensor circuit comprising a photodiode, an integration unit, and a capacitor unit. The cathode of the photodiode is coupled to a first side of the capacitor unit, and an integration input terminal of the integration unit is coupled to a second side of the capacitor unit. The two ends of an integration capacitor of the integration unit are respectively coupled to the first side of the capacitor unit and an integration output terminal of the integration unit. Furthermore, a switch element of the capacitor unit is coupled between the anode of the photodiode and the first side of the capacitor unit.

DETAILED DESCRIPTION OF THE INVENTION

Certain terms are used to refer to specific components in the specification and claims. However, those skilled in the art of the present invention may use different terms to refer to the same component, and the specification and claims do not distinguish between components based on differences in terminology, but rather on differences in the overall technology. The term "comprising" or "including" used throughout the specification and claims are open-ended terms that should be interpreted as meaning "including but not limited to." Furthermore, the term "coupled" herein includes both direct and indirect means of connection. Therefore, if the description states that a first device is coupled to a second device, this means that the first device can be directly connected to the second device, or indirectly connected to the second device through other devices or other means of connection, allowing the first device and the second device to communicate with each other via electric signal.

Figure 3:
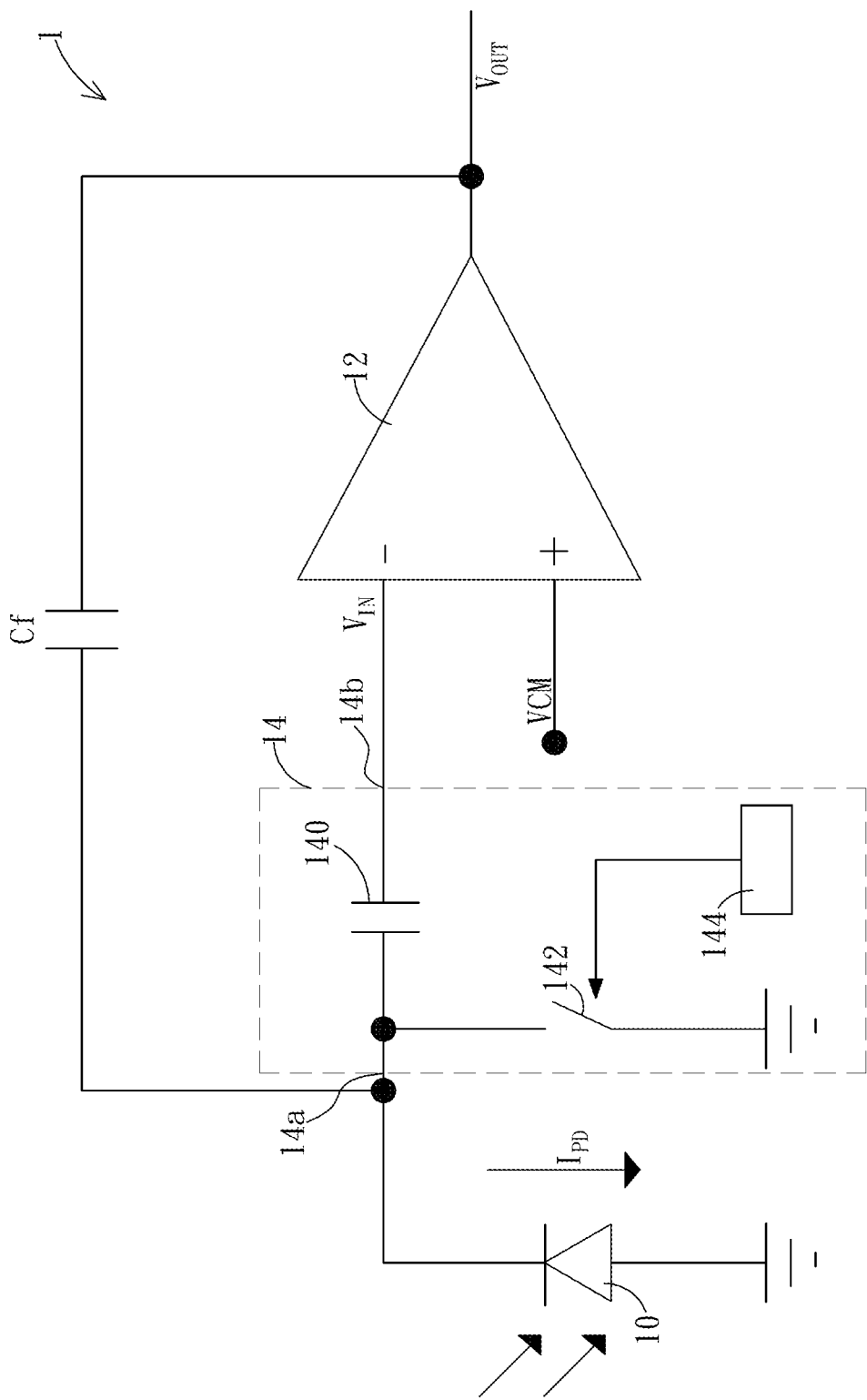
FIG. 3: a schematic diagram of a light sensor circuit in one embodiment of the present application.

Please refer to FIG. 3, which is a schematic diagram of an embodiment of the light sensor circuit 1 according to the present invention. As shown in the figure, the light sensor circuit 1 includes a photodiode 10, an integration unit 12, and a capacitor unit 14. The anode of the photodiode 10 is coupled to a shared signal terminal of the system, which is represented by the ground terminal in this embodiment, but the present invention is not limited to this. The cathode of the photodiode 10 is coupled to a first side 14a of the capacitor unit 14.

The integration unit 12 is used as the integration circuit of the analog-to-digital converter described above, and includes an integration input terminal $V_{IN}$, an integration output terminal $V_{OUT}$, and an integration capacitor Cf. The integration input terminal $V_{IN}$ is coupled to a second side 14b of the capacitor unit 14, and the two ends of the integration capacitor Cf are respectively coupled to the first side 14a of the capacitor unit 14 and the integration output terminal $V_{OUT}$. In this embodiment, a basic integration circuit implemented by an operational amplifier is used as an example to illustrate the integration unit 12, so the integration unit 12 includes an operational amplifier. A non-inverting input terminal of the operational amplifier can receive a reference voltage VCM, an inverting input terminal of the operational amplifier is the integration input terminal $V_{IN}$, and an output terminal of the operational amplifier is the integration output terminal $V_{OUT}$.

Figure 1:
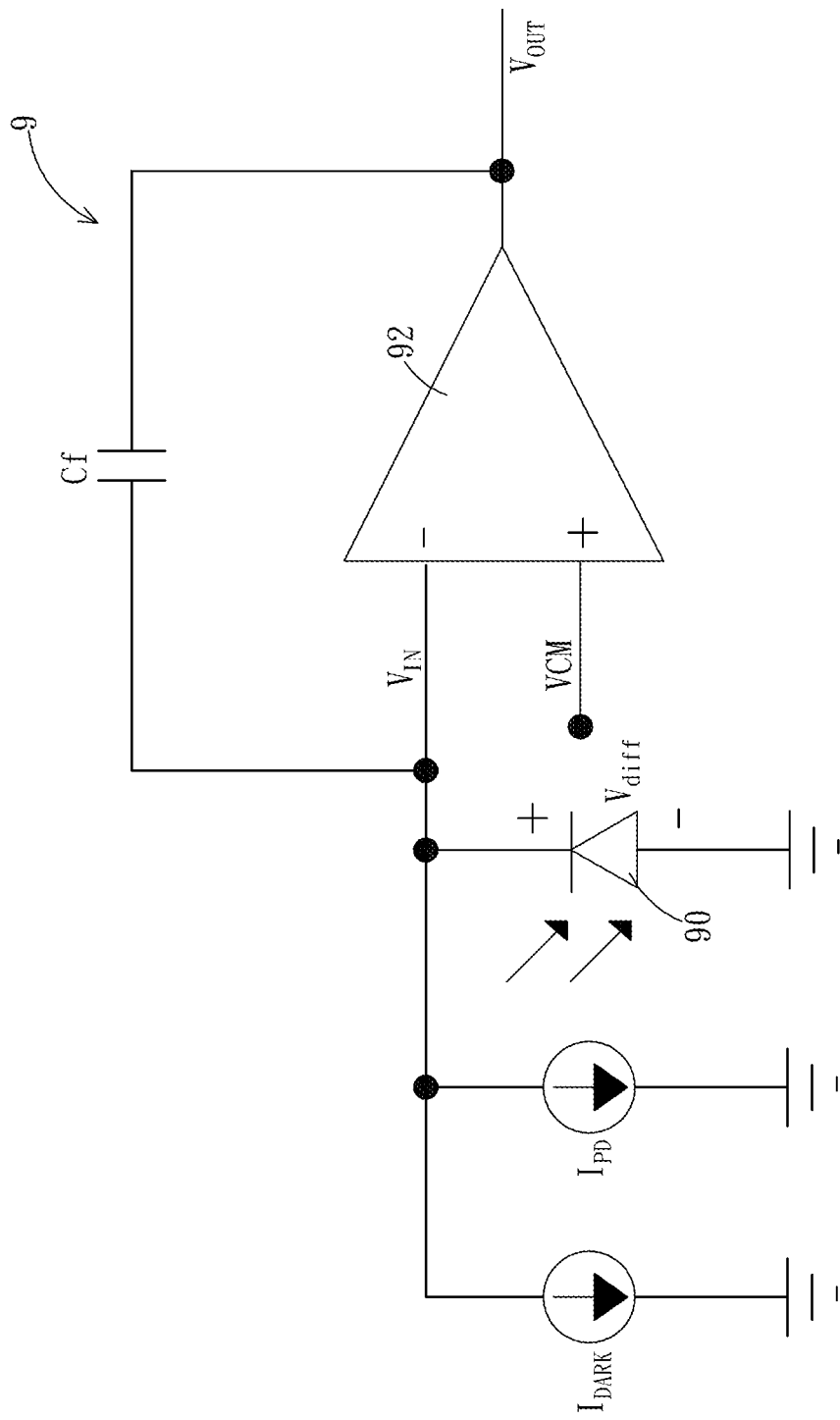
FIG. 1: a schematic diagram of the present analog-digital converting circuit.
Figure 2:
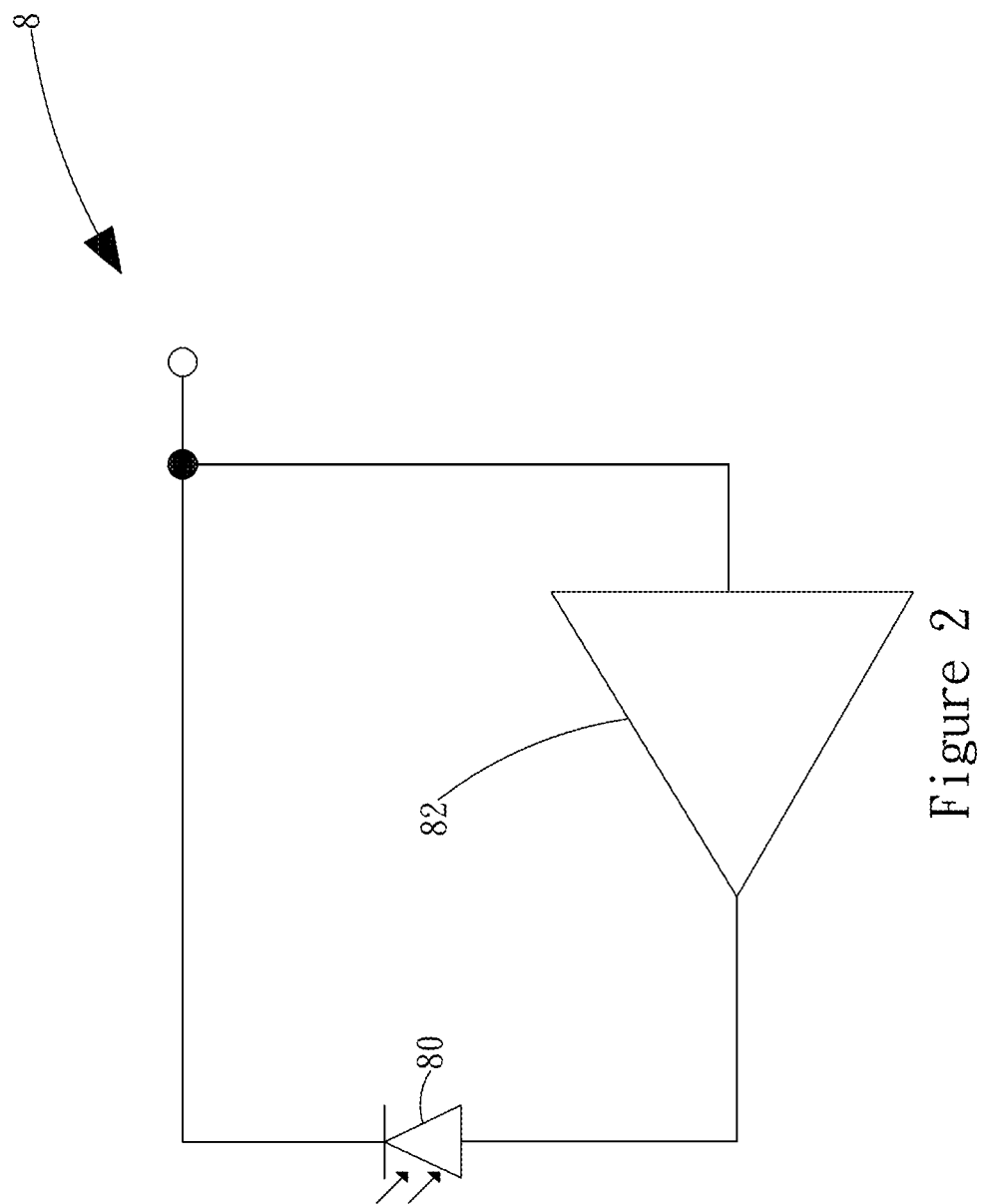
FIG. 2: a schematic diagram of the present light sensor circuit.

In other words, compared to the prior art shown in FIG. 1, both ends of the integration capacitor Cf of the integration unit 92 are coupled to the integration input terminal $V_{IN}$ and the integration output terminal $V_{OUT}$ of the integration unit 92. In this embodiment, the capacitor unit 14 is additionally provided, and the two ends of the integration capacitor Cf are respectively coupled to the first side 14a of the capacitor unit 14 and the integration output terminal $V_{OUT}$, and the integration input terminal $V_{IN}$ is coupled to the second side 14b of the capacitor unit 14.

The detailed arrangement and operation of the capacitor unit 14 are described below. The capacitor unit 14 includes a holding capacitor 140, a switch element 142, and a control unit 144. The two ends of the holding capacitor 140 are the first side 14a and the second side 14b of the capacitor unit 14. The switch element 142 is coupled between the anode of the photodiode 10 and the first side 14a. The control unit 144 is coupled to the switch element 142 to control its conduction or cutoff. During the time interval before the integration operation of the integration unit 12, the control unit 144 controls the switch element 142 to conduct, so that the first side 14a of the capacitor unit 14 maintains the same voltage level as the anode of the photodiode 10. In this embodiment, the anode of the photodiode 10 is coupled to the ground terminal, so the switch element 142 can be coupled between the ground terminal and the first side 14a. Therefore, when the control unit 144 controls the switch element 142 to conduct, the first side 14a of the capacitor unit 14 can be maintained at ground voltage.

During the time interval when the integration unit 12 performs integration operation, the control unit 144 controls the switching element 142 to be cutoff. At this time, a photocurrent $I_{PD}$ generated by the photodiode 10 due to receiving light can pass through the integration capacitor Cf and cause the integration unit 12 to perform integration operation. The holding capacitor 140 of the capacitor unit 14 can still maintain a voltage difference after the switching element 142 is cutoff, so that the first side 14a of the capacitor unit 14 can maintain the same or similar voltage level as the anode of the photodiode 10 (which is the ground voltage in this embodiment). Therefore, even if the reference voltage VCM received by the non-inverting input terminal of the operational amplifier in this embodiment is not the ground voltage, the first side 14a of the capacitor unit 14 can still be maintained at the ground voltage or at least close to the ground voltage, so that the photodiode 10 can be maintained in a zero bias state or a state close to zero bias. The switching element 142 can be composed of a metal-oxide-semiconductor field-effect transistor (MOSFET), a bipolar junction transistor (BJT), or other circuit switching components.

A dark current $I_{DARK}$ is the current generated by the photodiode itself under the influence of bias when the photodiode does not receive light, and its current equation is as follows:

$$I_{DARK} = I_{CO} \times \left( e^{\frac{V}{\eta V_T}} - 1 \right) \quad (1)$$

Noted that $I_{CO}$ is the reverse saturation current; $V_T$ (unit: V) is the temperature T (unit: °K)/11600, which is positively correlated with temperature; V is the bias voltage of the photodiode; and $\eta$ is the material coefficient of the photodiode. From the above equation, if the bias voltage of the photodiode is 0V, the dark current will not be affected by the coefficient $V_T$.

Accordingly, by keeping the first side 14a of the capacitor unit 14 at the same or close to the same voltage level as the anode of the photodiode 10, the photodiode 10 can be kept at zero bias voltage or near zero bias voltage, so that the two ends of the photodiode 10 will not be affected by the fluctuation of the transient voltage, i.e., the junction capacitance of the photodiode 10 will not form a charge/discharge current. In this way, the embodiment of the light sensor circuit 1 according to the present invention can effectively make the visible junction capacitance of the photodiode 10 close to zero, and can significantly reduce the effect of the dark current of the photodiode 10.

In contrast, as shown in FIG. 1, in the prior art, both ends of the integration capacitor Cf of the integration unit 92 are coupled to the integration input terminal $V_{IN}$ and integration output terminal $V_{OUT}$ of the integration unit 92. If the non-inverting input terminal of the integration unit 92 is operated by receiving a reference voltage VCM, due to the virtual short circuit characteristic of the operational amplifier, the reference voltage VCM will be coupled to the integration input terminal $V_{IN}$. If the reference voltage VCM is not equal to the anode voltage of the photodiode 90, a nonzero bias voltage Vdiff will be formed across the photodiode 90, leading to the formation of dark current in the photodiode 90 due to temperature effects.

Figure 4:
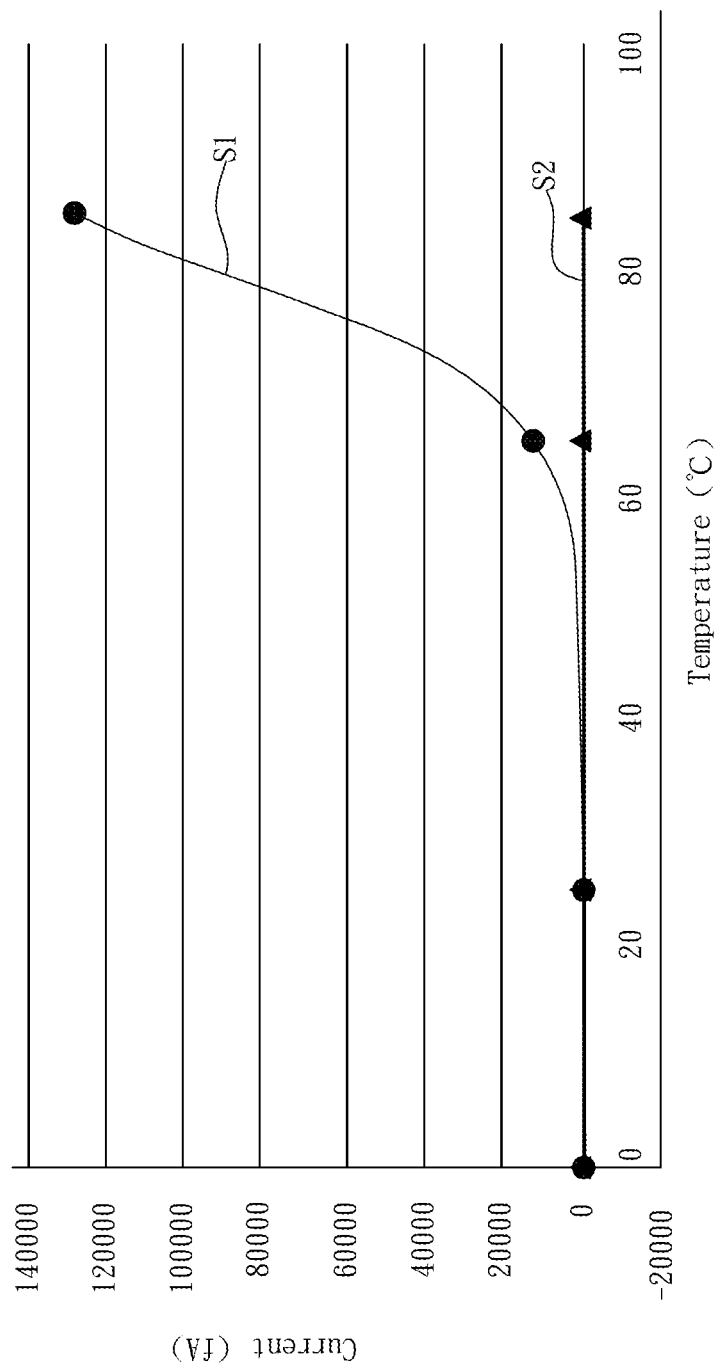
FIG. 4: a schematic diagram of the relationship curve between the dark current and temperature of the photodiodes in the prior art and the embodiment of the present invention.

Please refer to FIG. 4, where S1 represents the dark current-temperature relationship curve of the photodiode 90 in the prior art, and S2 represents the dark current-temperature relationship curve of the photodiode 10 in the embodiment of the present invention described above. By comparing S1 and S2, it can be seen that controlling the photodiode 10 to maintain a zero bias or near-zero bias state through the embodiment of the present invention described above can significantly reduce the effect of the photodiode 10 dark current, and the effect becomes more significant as the temperature increases.

It should be noted that although the control unit 144 of the capacitor unit 14 in this embodiment can be a separately set circuit for generating the control signal required to control the switch element 142, in practice, there is a clock control signal in the analog-to-digital converter indicating whether the integration unit 12 performs an integration operation. Therefore, the control unit 144 can be integrated into the control circuit of the analog-to-digital converter in practice, and the existing clock control signal of the analog-to-digital conversion can be directly used to control the switch element 142 to turn on or off.

Figure 5:
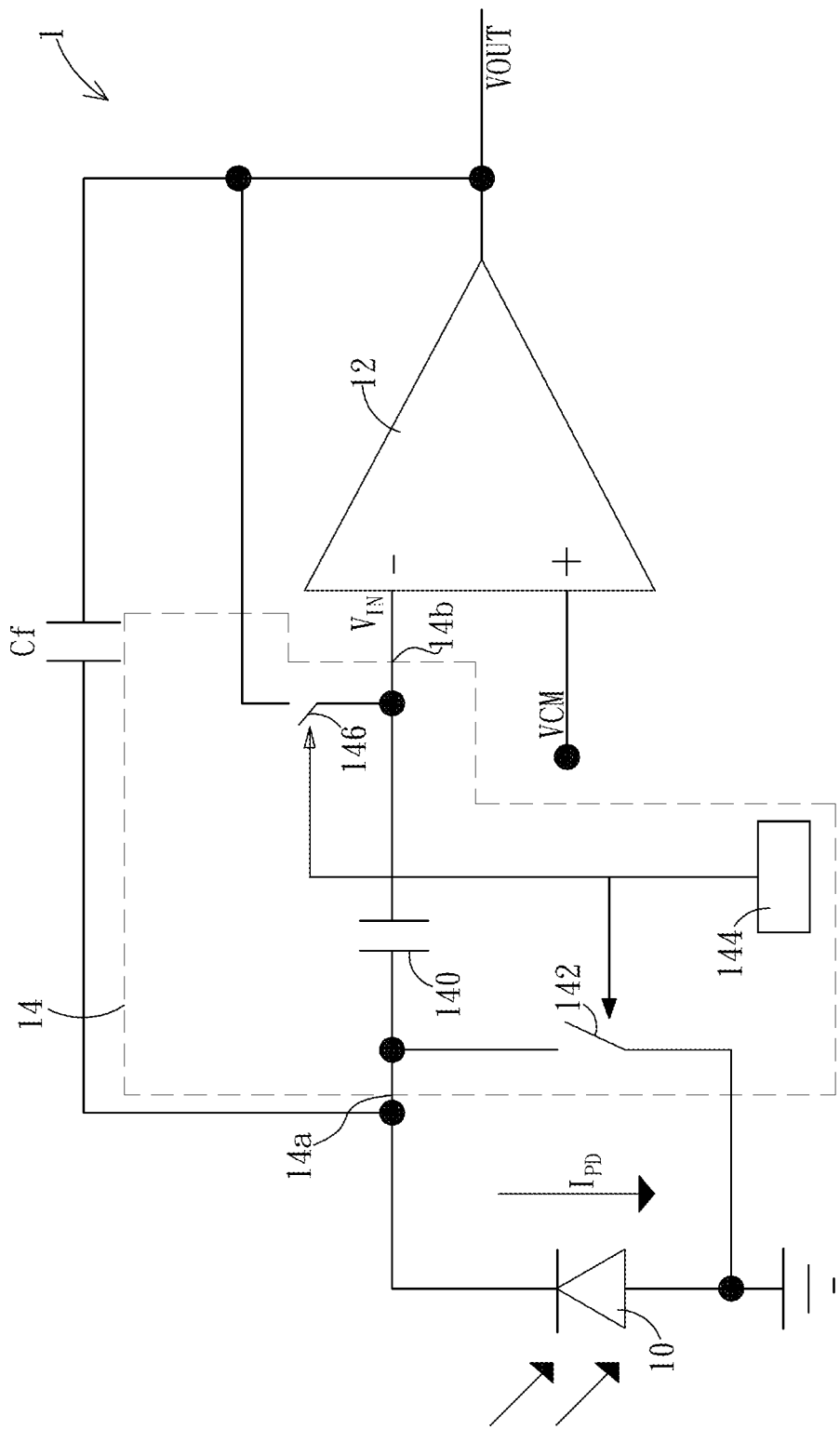
FIG. 5: the schematic diagram of a light sensor circuit in another embodiment of the present application.

Please refer to FIG. 5, which shows the circuit diagram of another embodiment of the light sensor circuit 1 of the present invention. The difference from the previous embodiment is that the capacitor unit 14 includes another switch element 146, which is coupled between the integration input terminal $V_{IN}$ and the integration output terminal $V_{OUT}$ of the integration unit 12. The control unit 144 is coupled to the other switch element 146 to control its conduction or cutoff in synchronization with the switch element 142. Therefore, during the time interval when the integration unit 12 has not performed the integration operation, the control unit 144 controls the other switch element 146 to conduct, so that the second side 14b of the capacitor unit 14 maintains the same voltage level as the integration output terminal $V_{OUT}$. During the time interval when the integration unit 12 performs the integration operation, the control unit 144 controls the other switch element 146 to be cutoff. At this time, there is no longer a signal conduction path between the integration input terminal $V_{IN}$ and the integration output terminal $V_{OUT}$ of the integration unit 12, except for the integration capacitor Cf and the holding capacitor 140, allowing the integration unit 12 to perform the integration operation.

By additionally setting the other switch element 146 to control the second side 14b of the capacitor unit 14 to maintain the same voltage level as the integration output terminal $V_{OUT}$ when the integration unit 12 has not performed integration operation, it is easier for the holding capacitor 140 of the capacitor unit 14 to maintain a voltage difference when the integration unit 12 performs integration operation, so that the first side 14a of the capacitor unit 14 can maintain the same or close to the voltage level as the anode of the photodiode 10.

In summary, the present invention provides a light sensor circuit comprising a photodiode and a capacitor unit. By controlling the capacitor unit to maintain the cathode of the photodiode at the same or a similar voltage level as the anode, the visible junction capacitance of the photodiode can be effectively reduced to approach zero, thereby greatly reducing the impact of the photodiode dark current. Therefore, when the light sensor circuit is applied to an analog-to-digital converter, it can effectively maintain the performance and accuracy of the analog-to-digital converter.

In addition, compared to the prior art where voltage followers composed of operational amplifiers or source followers are used to control the voltage at the two ends of the photodiode, in each of the embodiments of the present invention, the same technical effect can be achieved through simple circuit constructions such as capacitive elements and switch elements. This significantly reduces the difficulty of circuit design and manufacturing costs.

The above description is only the preferred embodiments of the present invention. Any equivalent variations and modifications made within the scope of the claims of the present invention shall be deemed to be within the scope of the present invention.

The invention claimed is:

1. A light sensor circuit, which includes:
   a photodiode with an anode and a cathode; and
   an integration unit including an integration input terminal, an integration output terminal, and an integration capacitor; and
   a capacitor unit including a holding capacitor, a switch element, a first side and a second side, wherein two ends of the holding capacitor are the first side and the second side of the capacitor unit, respectively;
   wherein the cathode of the photodiode is coupled to the first side of the capacitor unit, the integration input terminal is coupled to the second side of the capacitor unit, the two ends of the integration capacitor are respectively coupled to the first side of the capacitor unit and the integration output terminal, and the switch element is coupled between the anode of the photodiode and the first side of the capacitor unit.

2. The light sensor circuit of claim 1, wherein the capacitor unit further comprises a control unit that is coupled to the switch element to control its conduction or cutoff.

3. The light sensor circuit of claim 2, wherein the control unit controls the switch element to conduct during a time interval in which the integration unit has not performed an integration operation, and to be cutoff during a time interval in which the integration unit is performing the integration operation.

4. The light sensor circuit of claim 1, wherein the capacitor unit comprises another switch element, which is coupled between the integration input terminal and the integration output terminal of the integration unit.

5. The light sensor circuit of claim 4, wherein the capacitor unit further comprises a control unit that is coupled to both the switch element and the other switch element to control their conduction or cutoff.

6. The light sensor circuit of claim 5, wherein the control unit controls both the switch element and the other switch element to conduct during a time interval in which the integration unit has not performed an integration operation, and to be cutoff during a time interval in which the integration unit is performing the integration operation.

7. The light sensor circuit of claim 1, wherein the integration unit comprises an operational amplifier, a non-inverting input terminal of the operational amplifier receives a reference voltage, an inverting input terminal of the operational amplifier is the integration input terminal, and an output terminal of the operational amplifier is the integration output terminal.

8. The light sensor circuit of claim 7, wherein the reference voltage is not equal to the voltage of the anode of the photodiode.

* * * * *